UNITED STATES PATENT OFFICE.

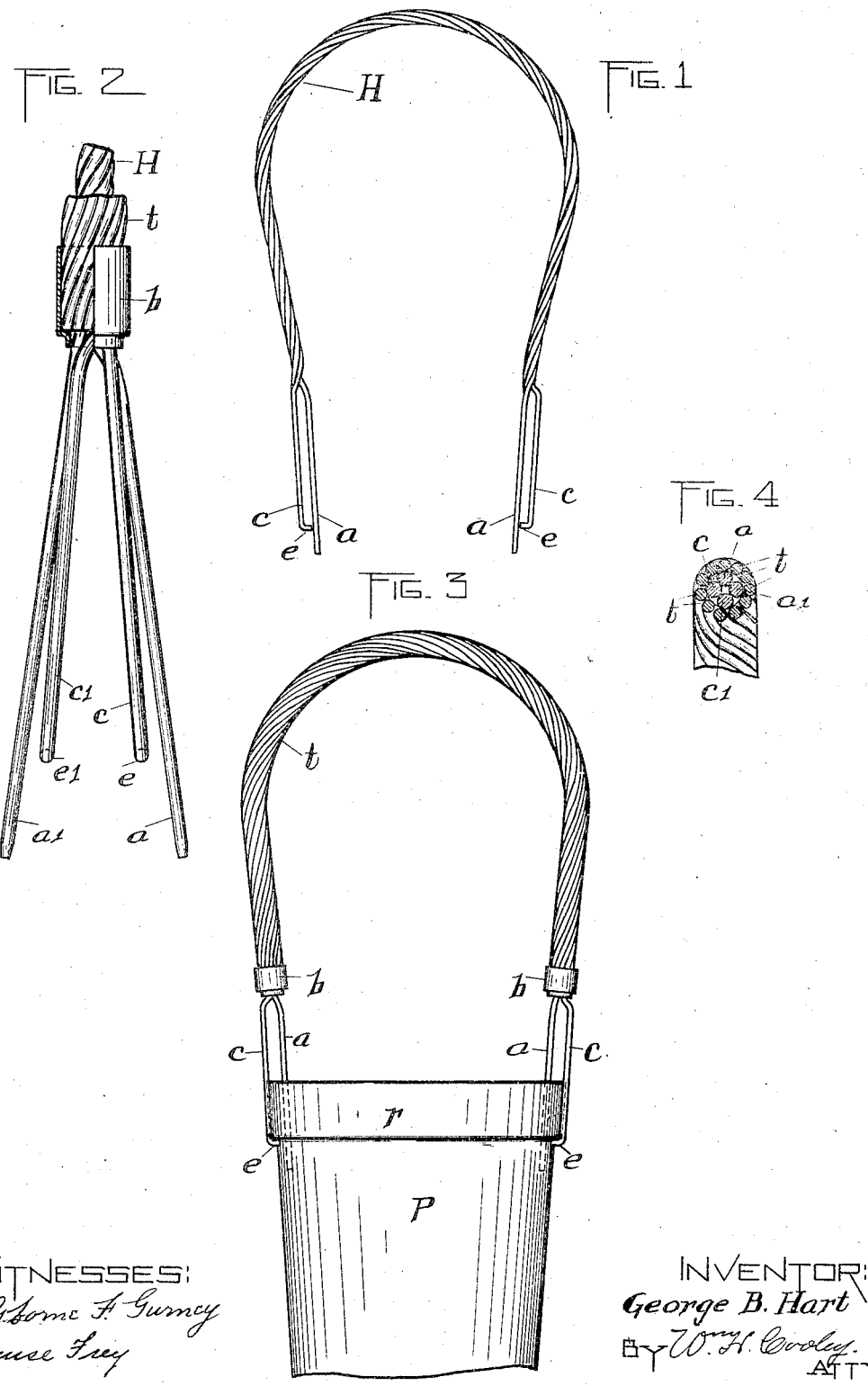

GEORGE B. HART, OF ROCHESTER, NEW YORK.

DETACHABLE BAIL FOR FLOWER-POTS AND LIKE ARTICLES.

1,077,879.   Specification of Letters Patent.   Patented Nov. 4, 1913.

Application filed March 13, 1909. Serial No. 483,142.

*To all whom it may concern:*

Be it known that I, GEORGE B. HART, a citizen of the United States, and a resident of Rochester, in the county of Monroe and State of New York, have invented a new and Improved Detachable Bail for Flower-Pots and like Articles, of which the following is a specification.

The object of my present invention is to provide an inclosing means for the frame work or main body portion of a detachable bail or like article adapted to use with flower pots or other similar receptacles. Such inclosing means may, preferably, stiffen the handle and provide a satisfactory hand-hold for engagement by the hand of the user and it may also be of a character to improve the general appearance of the handle. While such inclosing means for such a handle may be adapted to use with handles of various constructions, I prefer to embody within such inclosing means a frame work or body portion of a detachable bail such as may be made in accordance with the description thereof contained in my United States Patent Number 876,872, issued January 14, 1908, for an improved detachable bail for flower pots.

The interior frame work of such a handle comprises at least two wires twisted together to form the main body portion of the bail and with the free end of a wire at each end of the bail adapted to engage within and another free end of a wire at each end adapted to engage outside of the flower pot or receptacle to be carried by such bail. While a bail may be made from two of such wires, still, I prefer that such bail be made from at least three and preferably four of such wires so as to provide at least two of such members adapted to engage the side wall of the flower pot or like receptacle on one side and coöperating therewith one, and preferably two, on the other side of the wall of the flower pot. Around the flower pots and like articles, such as are designed to be supported and carried by such bails, and near the top thereof there is usually provided a rim consisting of a thickened portion of the side wall and with the projection formed by such thickened portion extending outwardly from the outside of the main portion of the wall. For engaging under such rim the free ends of the wires at each end of the bail, which are arranged to engage the outside of the receptacle, are provided with hooks. The wires comprising such a bail are so twisted together that there is a tendency between the coöperating and opposing members at each end thereof to spring together and firmly engage the outside and inside of the side wall of the flower pot or receptacle in order to more securely hold the same.

Around the frame work of, such a handle, in accordance with my present invention, I twist suitable strips of flexible material, preferably rods or twigs of willow, such as are used in the manufacture of baskets and like articles,—and such rods may preferably also be integral and round rather than split, and it is also preferred that they be integral. Such strips or rods are firmly twisted around the body of the handle and held at their ends, which are preferably cut off to present an even surface at the end of the handle and held from untwisting by means of inclosing ferrules. The ferrules are slipped over the ends of the wires comprising the body of the handle before such ends are twisted up into engaging hooks and such twisted up hooks serve to prevent the ferrules from slipping off, and, inasmuch as the rods of willow or strips of other flexible material cannot untwist without extending longitudinally of the handle and as the inclosing ferrules are prevented by the hooks on the handle from longitudinal movement toward the ends of the handle, such rods or inclosing strips are firmly held in place by the encircling ferrules, and there is thus provided an efficient and economical construction by means of which the general appearance and usefulness of the handle are greatly improved and the handle is also enlarged at those parts adapted to be engaged by the hands of the user and the twisted up strips of flexible material or rods of willow form a suitable support for climbing vines or the tendrils of any plant which may be contained within the flower pot upon which the handle is used.

The accompanying drawings illustrating such a bail provided with inclosing members in accordance with my invention are as follows.

Figure 1 is a side view of the interior frame work of the bail. Fig. 2 is a view of the lower left hand end of the completed bail H as seen from the outside. Fig. 3 is a side view of a completed bail made in accordance with my invention and shows the same attached to a flower pot or like article. Fig. 4 is a sectional view of the handle at approximately its center.

Similar letters refer to similar parts in the different views.

Referring to the drawings:—the body or frame work of my bail comprises at least two wires and preferably three or four, four being shown in the drawings, firmly twisted together, as indicated, to form the main body portion H of the bail. Two of the free ends as $c$ and $c^1$ at each end of the bail have hooks as $e$ and $e^1$ respectively formed thereon adapted to clasp the usual rim $r$ around the top and on the outside of the flower pot P, while the free ends $a$ and $a^1$ at each end of the bail are adapted to extend downward against the inner surface of the side wall of the pot. The normal tendency of the members $a$ and $a^1$ is to spring outwardly while that of the members $c$ and $c^1$ is to spring inwardly.

In attaching the bail, the members $a$ and $a^1$ at each end of the handle or bail are brought against the inside of the flower pot or like article and the members $c$ and $c^1$ are sprung outwardly and each end of the handle is forced down so that the hooks $c$ engage on the outside of the flower pot P and then the handle may be forced down until the parts assume the final and operative positions indicated in Fig. 3. The wire strands are reversed in position as they enter the twisted portion of the handle, resulting in a greater elasticity and a more effective springing action between the members $a$ and $a^1$ and $c$ and $c^1$. After the wires forming the main portion of the handle have been twisted up, the willow twigs $t$ are twisted around the handle and the ends inclosed and prevented from spreading by the ferrules $b$ which are slipped thereover, then the free ends of the wires forming the body of the handle are bent up into engaging hooks as above described.

The ferrules $b$ may be retained on the handle to inclose and hold the ends of the strips or willow twigs $t$ in any desired way, although I prefer that the twigs should be made of such a length that the bending up of the engaging members on the free ends of the wires comprising the body of the handle operates to engage the ferrules and hold them against removal and with the bottoms or partially inclosing ends of the ferrules against the ends of the twigs $t$.

It is believed that from the foregoing description, the construction and method of using my inclosing means for handles of the character described, are sufficiently clear to call for no further explanation.

What I claim is:—

1. In combination with the bail for a flower pot or like article provided with separable members at its ends, a plurality of inclosing strips of comparatively light, flexible and elastic material and of substantially even length loosely twisted around the bail; means for retaining the inclosing strips in place comprising a ferrule engaging loosely over the lower ends thereof and provided with an inwardly extending annular flange at its lower end, the separable members of the bail bent over against the outside of the flanged end of the ferrule and operating to hold the same in place and with the flange thereof engaging against the ends of such inclosing strips.

2. As a means for holding in place on a bail or handle a plurality of inclosing strips of comparatively light, flexible and elastic material loosely twisted around the handle with their ends substantially even, an inclosing ferrule located at each end of the inclosing strips and provided with an inwardly extending annular flange at its lower end, the ferrule engaging loosely around the inclosing strips near their ends, the bail having a member extending through the ferrule and bent over against the flanged end thereof to hold the flange in place against the ends of such inclosing strips.

GEORGE B. HART.

Witnesses:
LOUISE FREY,
OSBORNE F. GURNEY.